United States Patent [19]
Mazziotti

[11] Patent Number: 4,861,314
[45] Date of Patent: Aug. 29, 1989

[54] VERSATILE MOUNTING FOR BEARING CUPS OF UNIVERSAL JOINTS

[75] Inventor: Philip J. Mazziotti, Toledo, Ohio

[73] Assignee: The Zeller Corporation, Defiance, Ohio

[21] Appl. No.: 141,141

[22] Filed: Jan. 6, 1988

[51] Int. Cl.$^4$ .............................................. F16D 3/41
[52] U.S. Cl. .................................... 464/130; 464/136
[58] Field of Search ............... 464/128, 129, 130, 132, 464/136

[56] References Cited

U.S. PATENT DOCUMENTS

| | | | |
|---|---|---|---|
| 1,989,832 | 2/1935 | Swenson | 464/130 |
| 2,315,006 | 3/1943 | Misch | 464/128 X |
| 2,353,299 | 7/1944 | Dunn | 464/129 |
| 3,074,255 | 1/1963 | Reinecke | 464/128 |
| 3,958,431 | 5/1976 | Moring | 464/130 |
| 4,505,689 | 3/1985 | Mazziotti | 464/130 |

FOREIGN PATENT DOCUMENTS

| | | | |
|---|---|---|---|
| 144821 | 8/1984 | Japan | 464/128 |
| 95221 | 5/1985 | Japan | 464/132 |
| 2090373 | 7/1982 | United Kingdom | 464/130 |

Primary Examiner—Daniel P. Stodola
Attorney, Agent, or Firm—Allen D. Gutchess, Jr.

[57] ABSTRACT

A versatile mounting is provided for a bearing cup or race located in a yoke arm of a universal joint. The mounting includes an adapter sleeve which receives a bearing cup and enables it to be located in a larger bore of an existing yoke arm. The adapter sleeve has an annular flange which extends inwardly and contacts a closed end of the bearing cup. The sleeve also has at least one locating surface by means of which it can be located in a predetermined position in the yoke arm bore by means of a mounting fastener which engages the sleeve locating surface and a locating surface on the yoke arm adjacent the bore.

8 Claims, 4 Drawing Sheets

VERSATILE MOUNTING FOR BEARING CUPS OF UNIVERSAL JOINTS

This invention relates to a mounting for a bearing cup or race of universal joints and more specifically to a bearing cup replacement kit embodying the mounting for replacing cups of different existing universal joints.

The bearing cup mounting in accordance with the invention incorporates, in part, the bearing cup mounting shown in my U.S. Pat. No. 4,505,689, issued Mar. 19, 1985. The bearing cup in that patent has recessed locating surfaces uniformly spaced around the periphery of the cup, being diametrically opposed when two such surfaces are employed. The locating surfaces are located in a common plane and terminate at the peripheral edge of the cup. The recessed surfaces have peripheries in the shape of part of a circumference of a circle having a predetermined radius, and extend less than 180°. The yoke arms have corresponding threaded holes in a locating surface or locating surfaces around the cup bore and uniformly space therearound. A fastener with a threaded shank is provided for each of the threaded holes and means forming an annular, planar surface around the threaded shank provides an additional locating surface which engages the locating surface of the arm and the recessed locating surface of the cup to accurately locate the cup relative to the yoke arm and to the opposite cup in the other arm. The annular surface means has a radius substantially equalling the radius of the corresponding recessed cup surface to fit closely therewith. In this manner, the annular means also is effective to prevent the cup from rotating relative to the arm. The annular locating means can be in the form of an annular retaining ring or washer, or can be in the form of a surface below the head of a shoulder bolt, hence being one piece with the threaded fastener or a separate piece.

That bearing cup mounting has a number of advantages over those heretofore known. A bearing cup mounting flange is eliminated to eliminate the welding and machining processes required thereon and to reduce weight. With larger universal joints, when the bearing cup is to be replaced, the operation usually occurs under the vehicle, in less than ideal conditions. With that bearing cup mounting the bearing cup can be forced partly through the yoke arm toward the opposite one to break loose the opposite cup from the arm, if rusted, for example. The cup also does not require a press fit in the arm since the mounting both positions the cup relative to the yoke arm and to the opposite cup and also prevents rotation of the cup.

The bearing cup mounting according to the invention has first, recessed peripheral locating surfaces and also has a second locating surface, being a planar surface on the closed end of the bearing cup which is precisely machined or otherwise formed. The bearing cup or race can be mounted in a bore of a yoke arm with locating surfaces of fasteners engaging the recessed locating surfaces. The bearing cup can also be used with a different yoke arm of a different universal joint with similar fasteners or with retaining rings or the like engaging the second, planar locating surface. Depending on which of the locating surfaces is used, the spacing between the bearing cups in opposite yoke arms can then be varied to accommodate particular crosses used with particular universal joints. When embodied in a replacement kit, the bearing cups or races with a cross of a given size can be used for replacement purposes with two or more different sized yoke arms of existing universal joints. Hence, fewer replacement kits can be employed to meet the demands of a variety of existing universal joints in the after-market.

The versatility of the bearing cup mounting in accordance with the invention can also be enhanced by employing an adapter sleeve embodying the invention with a bearing cup. The adapter sleeve enables a bearing cup of one size to be mounted and used in existing yoke arms having bores of different diameters. The adapter sleeve can employ cylindrical side walls of different thicknesses to mount a particular bearing cup or race in yoke arm bores of several different diameters.

It is, therefore, a principal object of the invention to provide a more versatile mounting for a bearing cup or race of a universal joint.

Another object of the invention is to provide a mounting for a bearing cup in which one size of bearing cup can be employed in different yoke arms of different existing universal joints.

A further object of the invention is to provide a bearing cup for a universal joint, which cup has locating surfaces in two planes which are perpendicular to the axis of the cup and are spaced longitudinally along the cup.

Still another object of the invention is to provide a bearing cup replacement kit including adapter sleeves which enable a given size bearing cup to be used with yoke arms having bores of different diameters.

Many other objects and advantages of the invention will be apparent from the following detailed description of preferred embodiments thereof, reference being made to the accompanying drawings, in which.

Figure 1:
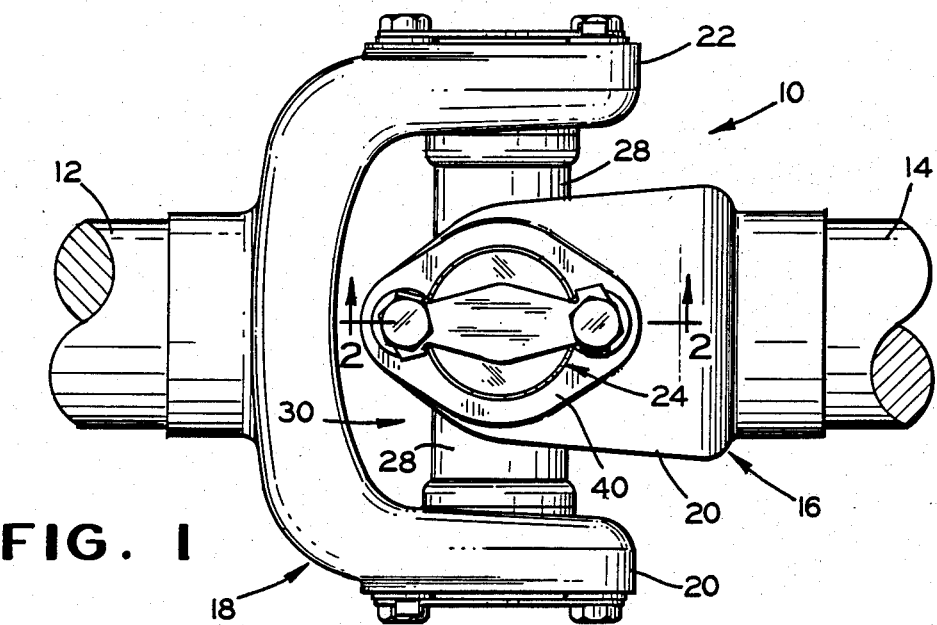
FIG. 1 is a side view in elevation of a universal joint embodying the invention.

Referring to the drawings, and particularly to FIG. 1, a universal joint embodying the invention is indicated at 10 and connects drive and driven members 12 and 14 in the usual manner. The universal joint 10 includes two yokes 16 and 18 disposed at mutually perpendicular angles, each having arms 20 and 22 holding bearing cups 24. The bearing cups 24 receive trunnions 26 (FIG. 2) which extend outwardly at mutually perpendicular angles from a body 28 of a cross 30. The cross can be of a conventional design and be provided with lubrication passages 32 which can communicate with a grease fitting (not shown) to supply lubricant to needle bearings 34 disposed between the cups and the trunnions. Suitable resilient seals 36 are located at the open ends 38 of the cups 24 to retain lubricant in the cups and to seal out water and contaminants.

Each of the yoke arms 20 and 22 has a generally elliptical locating surface 40 formed thereon and surrounding a bore 42 in which the cup 24 is received. Rather than the single locating surface surrounding the bore, for the bearing cup mounting in accordance with the invention, two smaller diametrically-opposite locating surfaces would be sufficient, or three or more locating surfaces could be uniformly spaced around the bore 42 for particular mountings.

Each of the yoke arms 20 also has threaded or tapped holes or recesses 44 in the locating surface 40. In most instances, two of the threaded holes 44 are located on diametrically-opposite sides of the bore 42, although three or more may be uniformly spaced around the bore 42 and at equal distances from the bore, for particular mountings. In any case, the locating surface 40 must encompass each of the threaded yokes 44 to properly locate the cup 24 in the yoke arm 20 or 22.

Figure 2:
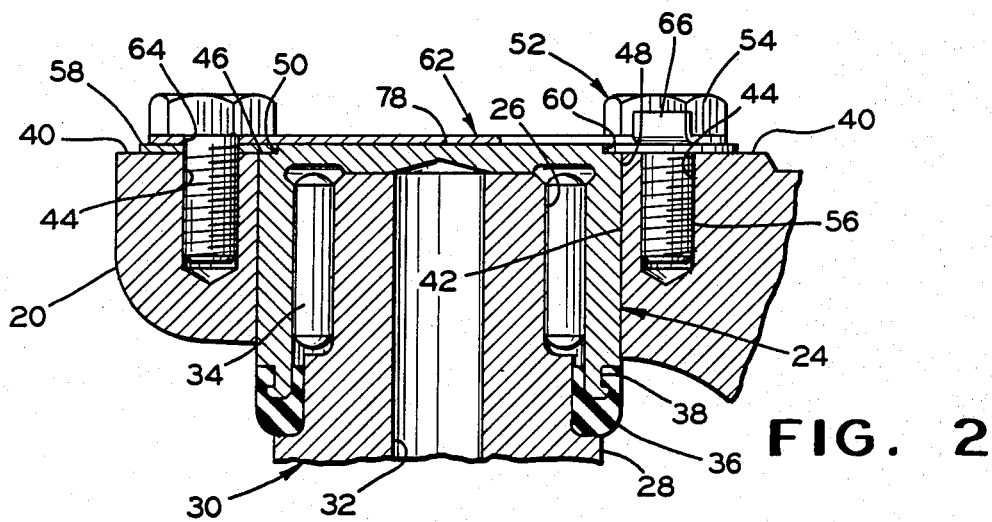
FIG. 2 is an enlarged, fragmentary view in cross section taken along the line 2—2 of FIG. 1, and showing a bearing cup mounting.
Figure 3:
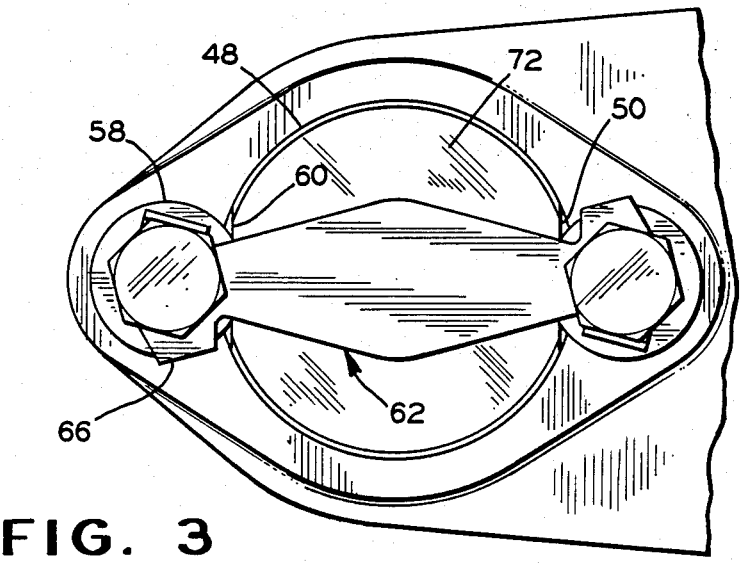
FIG. 3 is a top view in elevation of the bearing cup mounting of FIG. 2.
Figure 9:
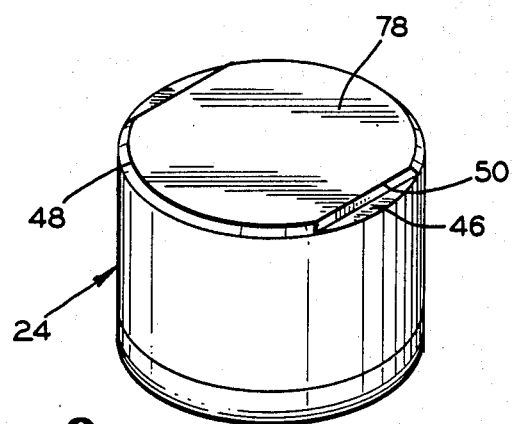
FIG. 9 is a view in perspective of a bearing cup in accordance with the invention employed in the universal joints of FIGS. 1-8.

The bearing cup mounting in accordance with the invention includes recessed locating surfaces 46 in a closed end 48 of the cup 24, as best shown in FIGS. 3 and 9. Each of the recessed locating surfaces has a periphery in the shape of part of the circumference of a circle of predetermined radius with the periphery extending less than 180° and terminating at the edge of the cup. The recessed locating surfaces are uniformly spaced around the peripheral edge of the closed end 48 of the cup and are located in a common plane. Also, the recessed surfaces 46 preferably have maximum widths, in the direction of the radius of the cup, which do not exceed the thickness of the side wall of the cup, as shown in FIG. 2, so as not to extend over the inner end of the cup and weaken the end wall.

There is at least one of the cup locating surfaces 46 for each of the threaded holes 44. Where the holes 44 are diametrically-opposite across the bore 42, the recessed surfaces 46 are also diametrically opposite. If three of the holes are employed, then three of the recessed surfaces 46 will be employed. A larger number of the recessed surfaces 46 can be employed around the peripheral edge of the closed end 48 of the cup 24, if desired, to more easily position the recesses relative to the threaded holes 44. If three of the threaded holes are employed, then six of the recessed surfaces 46 can be located around the cup.

The recessed locating surfaces 46 preferably have straight inner edges 50 which constitute chords of a circle so that the surfaces 46 are of D-shaped configuration. With this shape, the recessed surfaces need not extend radially inwardly as deeply as when they are of elliptical shape so as to not extend inwardly beyond the thickness of the cup side wall. This configuration of the surfaces 46 also enables those surfaces to be more easily machined or formed during the manufacture of the bearing cup.

The bearing cup mounting further includes a threaded fastener 52 for each of the threaded holes 44. In this instance, the fasteners 52 are machine bolts having hex heads 54 and threaded shanks 56.

Retaining rings or washers 58 form generally annular, planar locating surfaces around the threaded shanks 56 of the fasteners 52. The rings 58 are circular except for straight, chordal edges 60 which cooperate with the edges 50 of the locating surfaces 46. The lower locating surfaces of the rings 58 engage the locating surfaces 40 of the yoke arms 20 and 22 and also engage the recessed locating surfaces 46 of the cups 24 when the fasteners are tightened in the threaded holes 44. In this manner, the cups are located in a precise position relative to the yoke arms and also relative to the cups 24 in the opposite yoke arms.

The cooperation of the straight edge 60 of the ring 58 and the straight edge 50 of the recessed cup surface 46 also prevents possible rotation of the cup in the arm, which can wear an elliptical hole in the arm.

The recessed surfaces 46 are accurately formed relative to the inner ends of the bearing cups 24 to assure that the inner ends of the bearing cups in the opposite yoke arms are precisely located relative to one another so as to be precisely positioned relative to the ends of the trunnions 26 of the cross 30. With the recessed locating surfaces 46 being coplanar with the yoke arm locating arm surfaces 40, the closed ends 48 of the cups 24 protrude slightly beyond the outer surface of the yoke arms. This enables the inner ends of the bearing cups to be spaced slightly farther apart than where the closed ends are flush with the yoke arm surfaces. Consequently, a cross with slightly longer trunnions can be employed to provide a greater load capacity for the universal joint, if desired.

Where the retaining rings 58 are used as the fastener locating surfaces, a locking plate 62 can be employed with the threaded fasteners 52. The locking plate 62 has end holes 64 which receive the threaded shanks 56 of the fasteners 52. After the fasteners are tightened, locking tabs 66 are bent upwardly along the flats of the heads 54 to prevent loosening of the fasteners.

Figure 4:
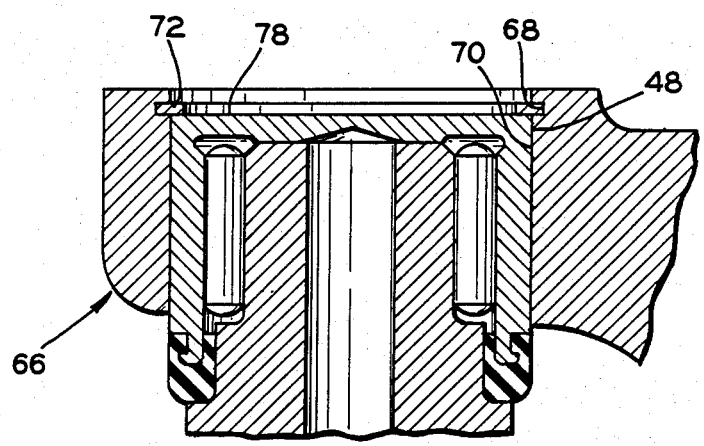
FIG. 4 is a view in cross section similar to FIG. 2 showing a modified bearing cup mounting.
Figure 5:
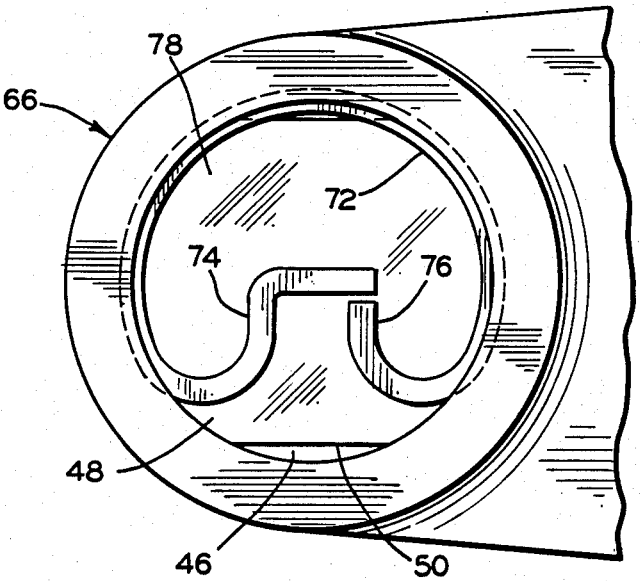
FIG. 5 is a top view of the modified mounting shown in FIG. 4.

A modified bearing cup mounting is shown in FIGS. 4 and 5. In this instance, a modified yoke arm or ear 66 has a precisely located annular groove 68 near an outer surface thereof around a bore 70. A precisely-formed retaining ring 72 is located in the groove 68 and is urged outwardly so as to be securely retained therein except when inner ends 74 and 76 thereof are compressed toward one another by a suitable tool. The retaining ring 72 bears against a second locating surface 78 which is planar and precisely machined at the closed end 48 of the bearing cup 24. With this installation, the lower locating surfaces 46 are not used. The locating surfaces 46 and 78, by being in two different planes located perpendicularly to the longitudinal axis of the bearing cup 24 enable the one cup 24 to accommodate different types of mountings and different sizes of yokes.

Figure 6:
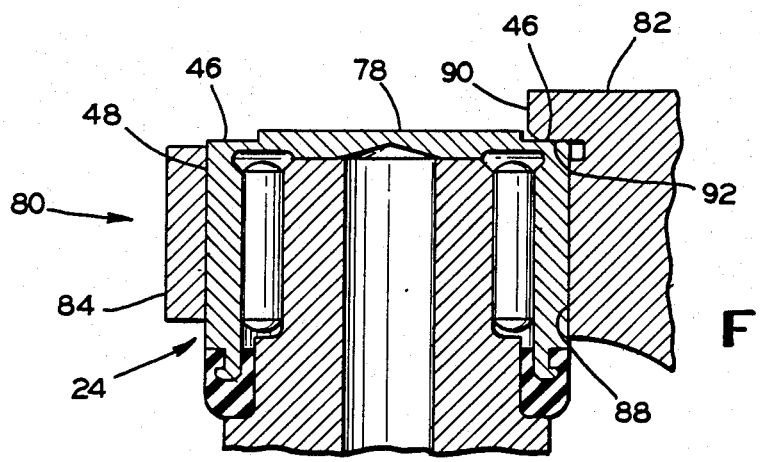
FIG. 6 is an enlarged, fragmentary view in cross section of a further modified bearing cup mounting.
Figure 7:
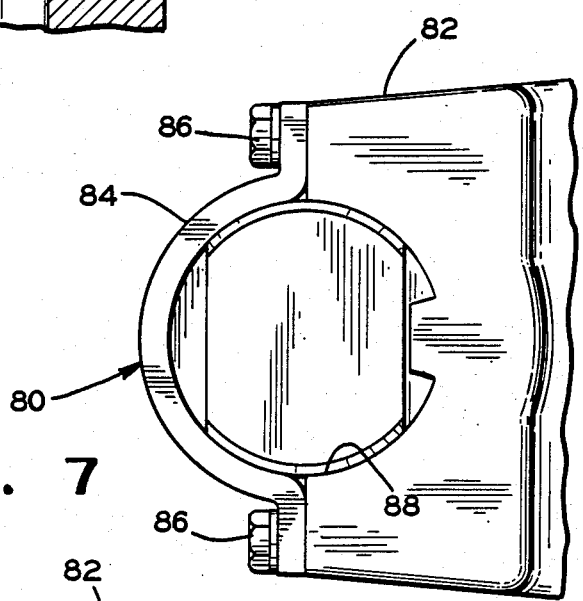
FIG. 7 is a top view of the modification shown in FIG. 6.

Referring to FIGS. 6 and 7, another modified bearing cup mounting is shown with the same bearing cup 24. In this instance, a modified yoke arm or ear 80 includes a base portion 82 with a mounting strap 84 affixed thereto by machine bolts 86 to form a substantially cylindrical bore. The bearing cup 24 is thereby clamped in a semi-cylindrical recess 88 in the base 82. The base 82 has a flange 90 extending outwardly over the semi-cylindrical recess 88 and has a precisely formed lower locating surface 92 thereon. As shown in FIG. 6, the flange locating surface 92 contacts one of the recessed locating surfaces 46 of the cup 24. In this instance, the surface 46 can be somewhat wider than the corresponding locating surfaces 46 of the bearing cups of FIGS. 2-5.

Figure 8:
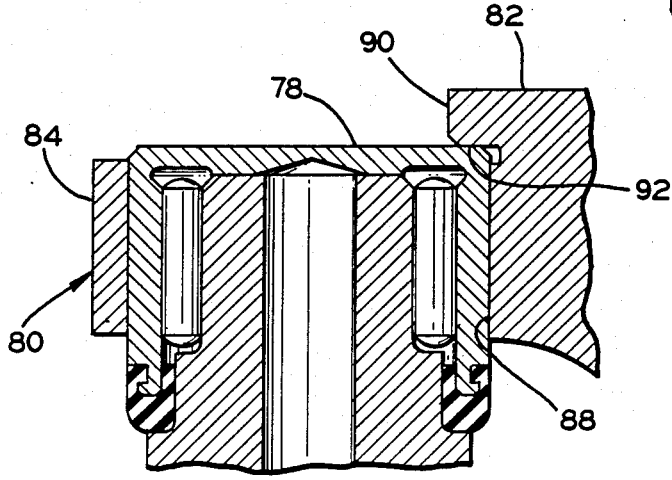
FIG. 8 is an enlarged view in cross section similar to FIG. 6 but showing the bearing cup in a different position.

In order to position the opposed bearing cups slightly closer together for a particular universal joint, the bearing cup 24 can be turned so that the flange locating surface 92 engages the outer, planar locating surface 78 of the cup, as shown in FIG. 8. Thus, the bearing cups 24 can be used with yokes of different sizes without modification of the bearing cups.

Figure 10:
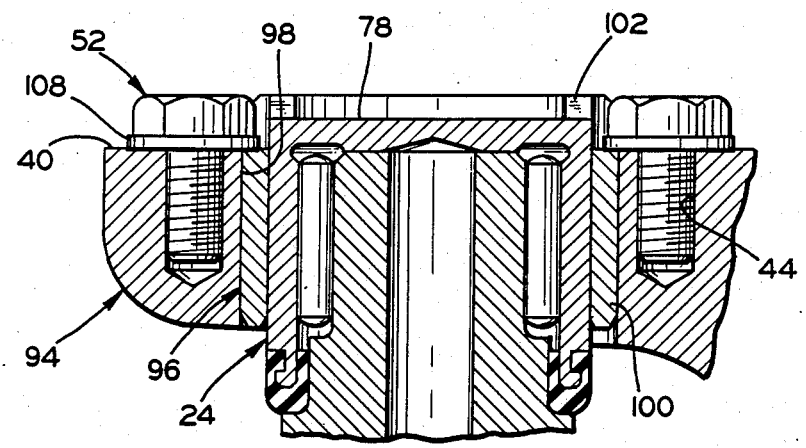
FIG. 10 is an enlarged view in cross section showing a bearing cup with an adapter sleeve therearound mounted in a bore of a universal joint yoke arm.
Figure 11:
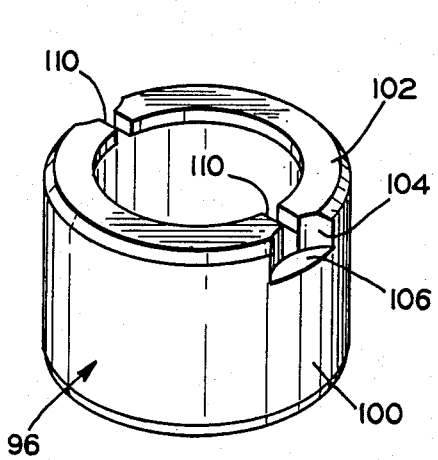
FIG. 11 is a view in perspective of the adapter sleeve shown in FIG. 10.
Figure 12:
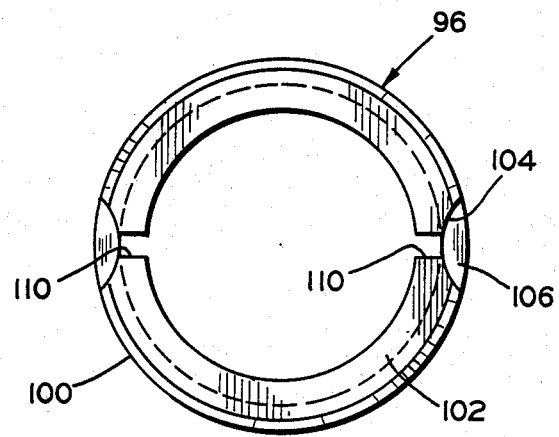
FIG. 12 is a top view of the adapter sleeve shown in FIG. 11.

Referring to FIGS. 10-12, the bearing cup or race 24 or similar cup can be used with a larger yoke arm or ear 94. For this purpose, an adapter sleeve 96 can be used around the bearing cups 24 and mounted with a close fit in a bore 98 of the yoke arm 94. The adapter sleeve 96 has an annular side wall 100 with precisely formed inner and outer surfaces to fit closely with the bearing cup and the bore. The adapter sleeve also has an inwardly-extending, annular flange 102 at an end thereof forming an annular surface which engages the locating surface 78 of the bearing cup 24 to accurately position the cup relative to the sleeve. The adapter sleeve also has two notches or recesses 104 through the flange 102 and extending into the edges of the annular side wall 100, ending in generally elliptical, diametrically-opposite locating surfaces 106. The fasteners 52, or similar ones, are threadedly received in the threaded hole 44 and have circular rings or washers 108 which engaged the locating surface 40 or similar ones on the yoke arm 94 and also engage the locating surfaces 106 on the adapter sleeve 96. The adapter sleeve 96 is thereby precisely located relative to the yoke arm 94 and the engagement of the annular inwardly-extending flange 102 with the locating surface 78 precisely positions the bearing cup 24 with respect to the adapter sleeve. The bearing cup 24, in this instance, extends outwardly beyond the yoke arm 94 so that the bearing cup 24 can accommodate larger crosses of a universal joint. Slots 110 in the flange 102 can receive a screw driver blade or the like to turn the sleeve 96 so as to position the notches 102 in alignment with the locating rings 108.

Figure 13:
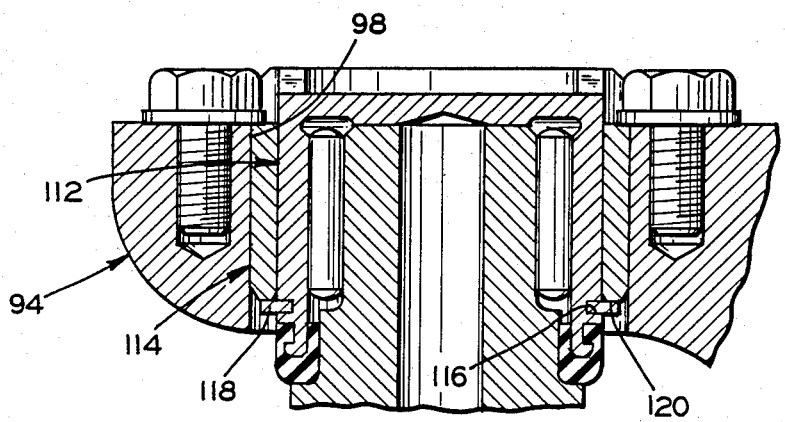
FIG. 13 is a view similar to FIG. 10 of a modified bearing cup and adapter sleeve mounted in a modified yoke arm.

Referring to FIG. 13, a slightly modified bearing cup or race 112 is shown in use with the larger yoke arm or ear 94. A slightly modified adapter sleeve 114 can be used around the bearing cup 112 and mounted with a close fit in the bore 98 of the yoke arm 94. The bearing cup 112 has an annular groove 116 therein near the open end thereof which receives a retaining ring 118 of the internally-locating type.

The adapter sleeve 114 is similar to the sleeve 96 except that an annular locating surface 120 is formed at an end of the sleeve and abuts the retaining ring 118. This precisely positions the bearing cup with respect to the sleeve so that the flange 102 of the sleeve 96 is not necessary. The sleeve 114 is precisely located relative to the yoke arm 94 in the same manner as the adapter sleeve 96. However, the adapter sleeve 96 or 114 can also be mounted similarly to the bearing cups of FIGS. 4, 6, and 8.

The bearing cup mounting in accordance with the invention thereby provides a versatile replacement kit to enable particular bearing cups and crosses to be employed with universal joints of different sizes and with yoke arms having different diameter bores. Inventory and production costs can thereby be substantially reduced.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A universal joint comprising a yoke having a pair of spaced arms, each of said arms having a transverse cylindrical bore aligned with the transverse cylindrical bore of the other arm, said arms also having planar locating surfaces near said bores, with said locating surfaces on said spaced arms being spaced apart predetermined distances, a flangeless bearing cup in each of said bores, said cup having a side wall of predetermined thickness, an open end, and a closed end with an outer, precise, planar locating surface, the diameter of the transverse cylindrical bore in each of said arms exceeding the outer diameter of the bearing cup therein, an adapter sleeve around the bearing cup and within said bore, said sleeve comprising an annular side wall having an inner cylindrical surface of predetermined diameter slightly larger than the outer diameter of said bearing cup and having an outer cylindrical surface of predetermined diameter slightly smaller than the diameter of said bore, said adapter sleeve having at least one locating surface to enable said sleeve to be mounted in a predetermined longitudinal position relative to the yoke arm, said adapter sleeve having an inwardly-extending, annular flange at one end of said annular side wall and engagable with the precise planar locating surface of the closed end of the bearing cup, said adapter sleeve having at least one recess in one end of said annular side wall and extending toward the other end of said annular wall, said recess terminating in said adapter sleeve locating surface, and mounting means for each of said cups and the corresponding arm and cooperating with said adapter sleeve locating surface and said arm locating surface to hold said cup in a predetermined position relative to the arm and to the opposite cup.

2. A universal joint according to claim 1 characterized by there being two of said adapter sleeve recesses and two of said adapter sleeve locating surfaces which are located diametrically opposite in peripheral portions of said annular side wall.

3. A universal joint according to claim 1 characterized by said one end wall having diametrically-opposite slots to receive a tool to enable said sleeve to be turned relative to the yoke arm.

4. An adapter sleeve adapted to mount a bearing cup in a yoke arm bore of larger diameter, said adapter sleeve comprising an annular side wall having an open end with an inner cylindrical surface of predetermined diameter extending from said open end toward another end of said adapter sleeve, and an outer cylindrical surface of predetermined diameter throughout the length of said adapter sleeve, said adapter sleeve having at least one locating surface to enable said sleeve to be mounted in a predetermined position relative to the yoke arm, said adapter sleeve having at least one recess in one end of said annular side wall extending toward the other end of said annular side wall, said recess terminating in said locating surface, and said adapter sleeve having an inwardly-extending, annular flange at the one end of said annular side wall forming an annular locating surface to be contacted by the bearing cup for positioning said cup in a predetermined longitudinal position relative to said adapter sleeve.

5. An adapter sleeve according to claim 4 characterized by there being at least two of said recesses and two of said locating surfaces.

6. An adapter sleeve according to claim 4 characterized by there being two of said recesses and two of said locating surfaces which are located diametrically opposite at peripheral portions of said annular side wall.

7. An adapter sleeve according to claim 4 characterized by said inwardly-extending, annular flange having diametrically-opposite slots therein to receive a tool for turning said adapter sleeve in the yoke arm bore.

8. An adapter sleeve according to claim 4 characterized by said sleeve forming an annular locating surface at said open end to be contacted by a retaining ring held by the bearing cup.

* * * * *